UNITED STATES PATENT OFFICE.

MARI E. WOLVEKAMP, OF OAKLAND, CALIFORNIA.

SOLUBLE COMBINATION WITH A COLLOIDAL SULPHARSENITE.

1,412,439.

Specification of Letters Patent. Patented Apr. 11, 1922.

No Drawing. Application filed June 1, 1920. Serial No. 385,593.

*To all whom it may concern:*

Be it known that I, MARI E. WOLVEKAMP, a subject of the Queen of the Netherlands, and a resident of Oakland, county of Alameda, and State of California, have invented certain new and useful Soluble Combinations with a Colloidal Sulpharsenite, of which the following is a specification.

My invention relates to the soluble stable combinations of the colloidal sulpharsenites of mercury and silver with a protective colloid salt, more particularly those protective colloid salts known as protalbuminates and lysalbuminates, which are obtained from serum albumin, egg albumin or casein, for medical purposes and my invention also relates to the process of manufacturing these products herein described and claimed.

The foremost object of my invention is to provide colloidal sulpharsenites which will be stable enough to allow of their solutions being sterilized by boiling and which may be obtained as dry solids by simple evaporation of their solutions without previously dialyzing away the electrolytes which may be present in their solutions as manufactured.

As a protective colloid the sodium salt of a protalbinic or a lysalbinic acid was found very suitable.

If one uses gum arabic instead of a protalbinate or a lysalbinate, colloidal solutions may be obtained, but upon the evaporation of these solutions to dryness none of the arsenic compound will re-dissolve in water, but the sodium protalbinates or lysalbinates, which I use, have such great power that even without an excess of sodium hydroxide the sulphides of arsenic and the monosulpharsenites of silver and mercury remain entirely soluble, even after drying.

By simple direct evaporation of the solutions without previous removal of their electrolyte content, perfectly soluble dry products may be obtained with a yield of 100%, and containing as much as 50% or more of sodium chloride or other electrolyte. This is a distinct advantage of these products.

The colors of the hydrosols of the sulphides of arsenic and the sulpharsenites resemble the corresponding more intensely colored antimony compounds.

Colloidal arsenous sulphide, arsenic pentasulphide and the mono-, tri-, penta-, and hepta- mercuric sulpharsenites are orange in color, whereas the corresponding antimony compounds are orange-red to wine-red in color.

The color of mercury sulpharsenites is not changed at ordinary temperatures by the addition of 4 gram-molecules of $0.1N$. sodium hydroxide to each gram-molecule of the sulpharsenite, but darkens at high temperatures at or near the boiling point due to the formation of mercuric sulphide and therefore an excess of sodium hydroxide should be carefully avoided when evaporating to dryness.

Sodium protalbinate has no reducing action on the sulpharsenites when warmed together with them in colloidal solution, whereas the pale salmon-red solution of tri-silver arsenate under the same conditions soon shows the brown color of colloidal silver.

In making colloidal arsenic pentasulphide the solution containing the sodium protalbinate, arsenic acid and sodium sulphide, must be previously warmed on a waterbath and then the exact amount of hydrochloric acid poured in, otherwise arsenous sulphide and sulphur will be formed.

The blood-red mono-silver-sulpharsenite and especially the compounds of mercury such as mono- and tri-mercuric-sulpharsenites, derived from a trivalent arsenic just as in unstable salvarsan, are in a suitable form for therapeutic experimentation on syphilis.

In the following examples there is taken for each 100 grams of sodium protalbinate (obtained from serum-albumin and containing approximately 6% ash), one-tenth gram-molecule of arsenic trioxide for making the sulpharsenites of mercury and silver.

*Example 1—Colloidal mono-mercuric-sulpharsenite.*—Dissolve 19.8 parts by weight of arsenic trioxide in a solution of 31.2 parts by weight of sodium sulphide and add a dilute acid solution containing 14.6 parts by weight of hydrochloric acid and pour this solution into a mixture of the solutions of 100 parts by weight of sodium protalbinate and of 27.2 parts by weight of mercuric chloride and add next a dilute acid solution containing 7.3 parts by weight of hydrochloric acid and evaporate the resulting colloidal solution at 100° C. to dryness. Yield:

196.4 parts by weight of colloidal combination containing 24.4% mono-mercuric-sulpharsenite.

*Example 2—Colloidal tri-mercuric-sulpharsenite.*—The same as for mono-mercuric-sulpharsenite, but with 46.8 parts by weight of sodium sulphide and 81.5 parts by weight of mercuric chloride. Yield: 272.0 parts by weight of colloidal combination containing 34.7% tri-mercuric-sulpharsenite.

*Example 3—Colloidal mono-silver-sulpharsenite.*—Dissolve 19.8 parts by weight of arsenic trioxide into a solution of 31.2 parts by weight of sodium sulphide and add a dilute acid solution containing 19.6 parts by weight of sulphuric acid and pour this solution into a mixture of the solutions of 100 parts by weight of sodium protalbinate and 34.0 parts by weight of silver nitrate and next add 1000 parts by volume of 2N. sulphuric acid, filter, wash the precipitate and redissolve with a dilute alkaline solution containing 6.0 parts by weight of sodium hydroxide and finally evaporate at 100° C. Yield: 120 parts by weight of colloidal combination containing 41.2% mono-silver-sulpharsenite.

While the preparative methods for the production of the above named colloidal compounds are those of a generally accepted form, it is obvious that modifications and changes can be made without departing from the spirit of the invention or the scope of the claims.

I claim:

1. The combination of a colloidal sulpharsenite with a protective salt of a protein.
2. The combination of a colloidal sulpharsenite of mercury with a protective salt of a protein.
3. The combination of a colloidal sulpharsenite with sodium protalbinate.
4. The combination of a colloidal sulpharsenite of mercury with sodium protalbinate.
5. The combination of a colloidal sulpharsenite with sodium lysalbinate.
6. The combination of a colloidal sulpharsenite of mercury with sodium lysalbinate.

MARI E. WOLVEKAMP.